(12) United States Patent
Richards

(10) Patent No.: US 12,728,466 B1
(45) Date of Patent: Sep. 8, 2026

(54) ADAPTOR FOR USE WITH CORE BIT AND AUGUR MOTOR

(71) Applicant: Bradley Richards, Gaffney, SC (US)

(72) Inventor: Bradley Richards, Gaffney, SC (US)

( * ) Notice: Subject to any disclaimer, the term of this patent is extended or adjusted under 35 U.S.C. 154(b) by 347 days.

(21) Appl. No.: 18/414,970

(22) Filed: Jan. 17, 2024

(51) Int. Cl.
*B23B 51/06* (2006.01)
*B23B 51/04* (2006.01)
*B23Q 11/10* (2006.01)

(52) U.S. Cl.
CPC .......... *B23B 51/06* (2013.01); *B23B 51/0473* (2013.01); *B23Q 11/10* (2013.01)

(58) Field of Classification Search
CPC ...... B23Q 11/10; B23B 51/06; B23B 51/0473
See application file for complete search history.

(56) References Cited

U.S. PATENT DOCUMENTS 2,510,203 A 6/1950 Andreasson
2,777,702 A 1/1957 Rodal
3,024,030 A 3/1962 Koch
3,791,660 A 2/1974 Bostley
D262,133 S 12/1981 Fain
4,693,646 A 9/1987 Andrews
4,770,570 A 9/1988 Tsui
5,092,717 A 3/1992 Fischer
2005/0105977 A1 5/2005 Ishihara
2012/0170989 A1 7/2012 Hardin

*Primary Examiner* — Moshe Wilensky

(74) *Attorney, Agent, or Firm* — Kyle A. Fletcher, Esq.

(57) ABSTRACT

The adapter for use with a core bit and auger motor includes an adapter and a water jacket. The adapter may adapt a motor shaft of an auger motor to drive a core bit in order to cut concrete. The water jacket may supply water to the adapter such that the water may flow down through the center of the adapter and into the core bit. The water may cool the core bit, may reduce airborne dust, may wash debris away from the hole being cut, or any combination thereof. The water jacket May rotationally couple to the adapter such that the water jacket remains stationary while the adapter turns. As a non-limiting example, the auger motor may be mounted on a boom of a front end loader such as a skid steer loader.

19 Claims, 6 Drawing Sheets

ADAPTOR FOR USE WITH CORE BIT AND AUGUR MOTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of cutting equipment and equipment adapters, more specifically, an adapter for use with a core bit and auger motor.

SUMMARY OF INVENTION

The adapter for use with a core bit and auger motor comprises an adapter and a water jacket. The adapter may adapt a motor shaft of an auger motor to drive a core bit in order to cut concrete. The water jacket may supply water to the adapter such that the water may flow down through the center of the adapter and into the core bit. The water may cool the core bit, may reduce airborne dust, may wash debris away from the hole being cut, or any combination thereof. The water Jacket may rotationally couple to the adapter such that the water jacket remains stationary while the adapter turns. As a non-limiting example, the auger motor may be mounted on a boom of a front end loader such as a skid steer loader.

An object of the invention is to provide an adapter that may adapt a motor shaft of an auger motor to drive a core bit.

Another object of the invention is to provide a water jacket that may supply water to the adapter.

A further object of the invention is to rotationally couple the water jacket to the adapter such that the water jacket may remain stationary while the adapter rotates.

Yet another object of the invention is to provide a water coupler aperture on the water jacket and a plurality of water inlets, a top water channel, and a bottom water channel on the adapter such that water supplied to the water jacket may flow to the interior of the core bit that may be coupled to the bottom of the adapter.

These together with additional objects, features and advantages of the adapter for use with a core bit and auger motor will be readily apparent to those of ordinary skill in the art upon reading the following detailed description of the presently preferred, but nonetheless illustrative, embodiments when taken in conjunction with the accompanying drawings.

In this respect, before explaining the current embodiments of the adapter for use with a core bit and auger motor in detail, it is to be understood that the adapter for use with a core bit and auger motor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adapter for use with a core bit and auger motor.

It is therefore important that the claims be regarded as including such equivalent construction insofar as they do not depart from the spirit and scope of the adapter for use with a core bit and auger motor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
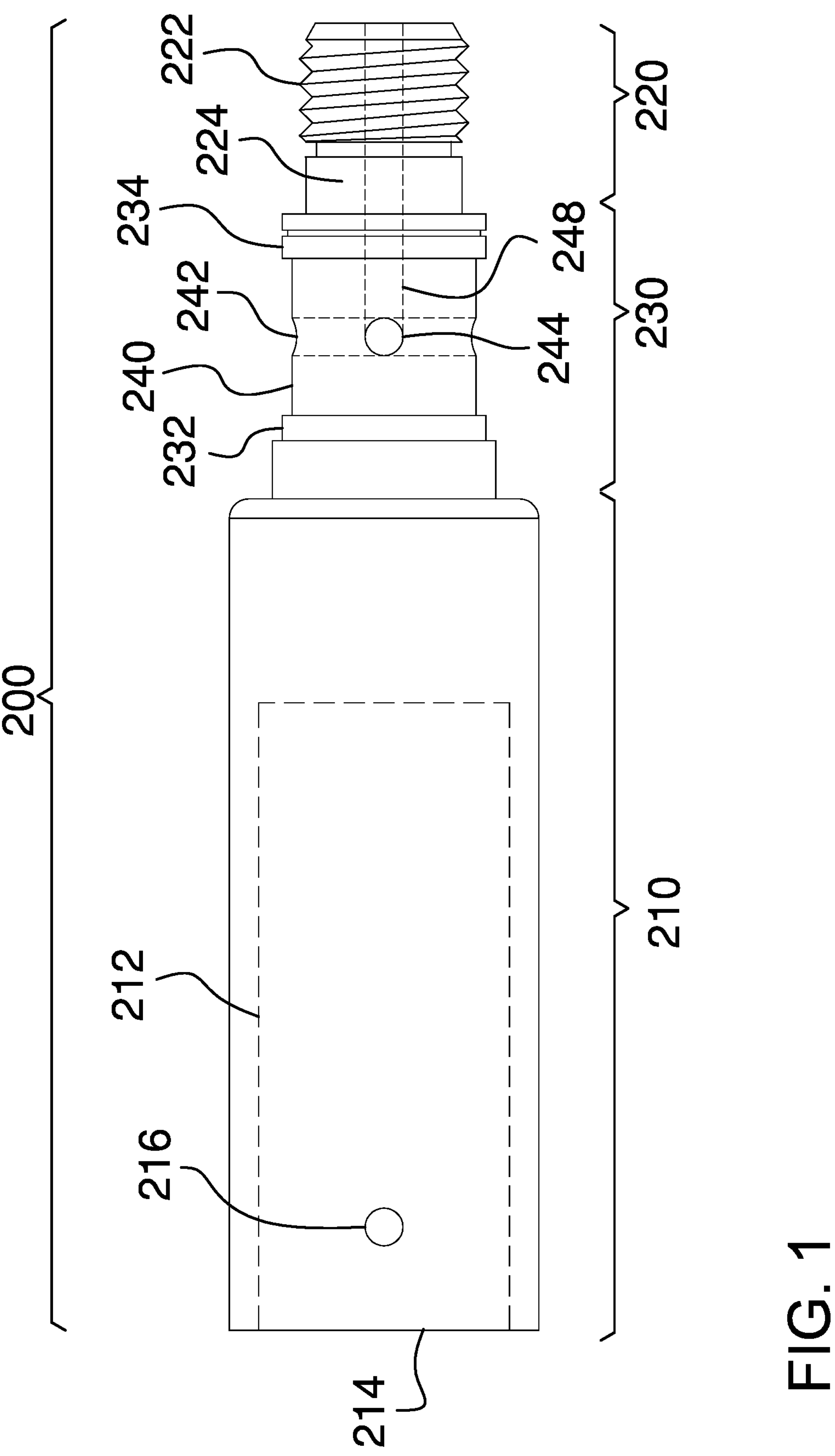
FIG. 1 is a front view of an embodiment of the disclosure.
Figure 2:
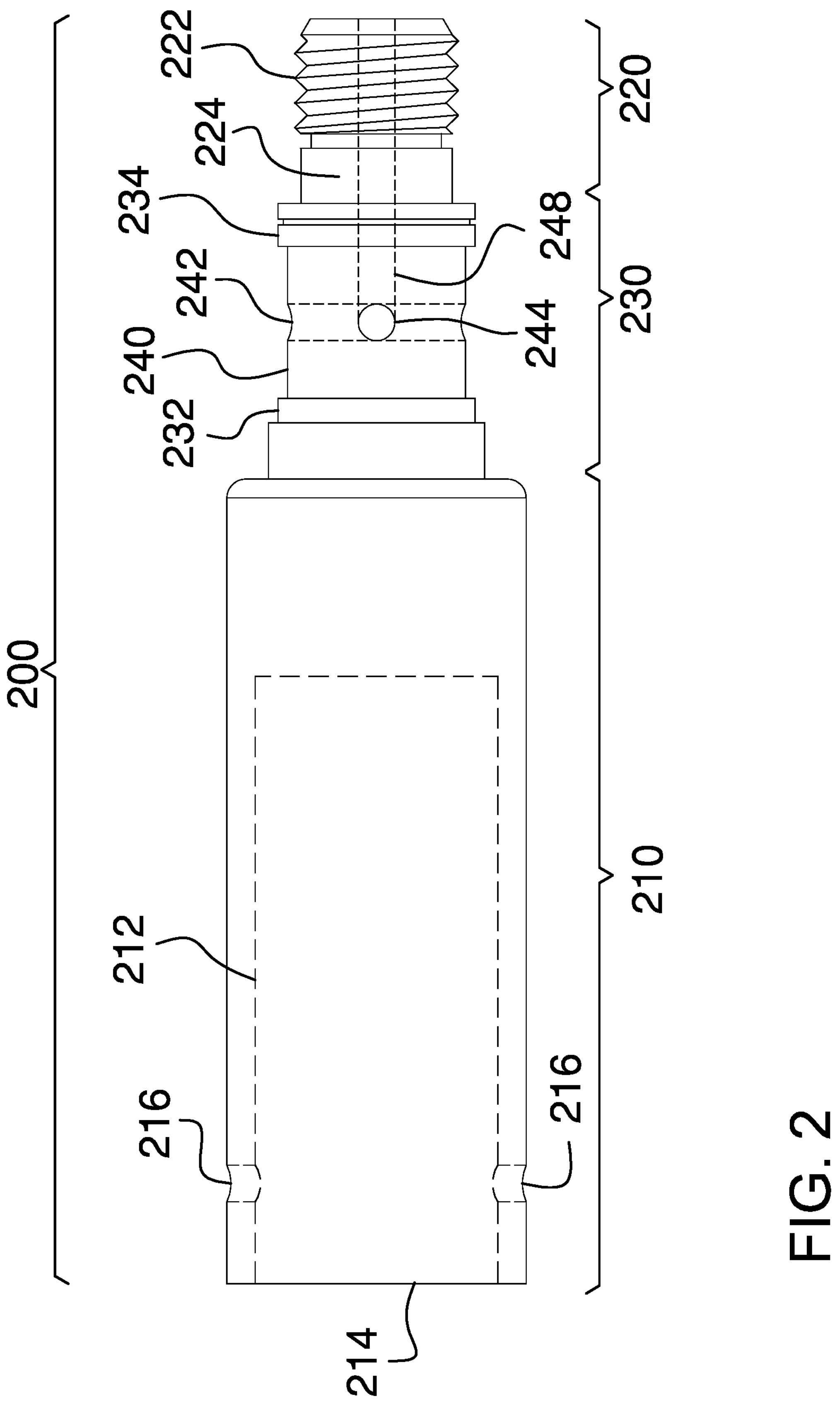
FIG. 2 is a top view of an embodiment of the disclosure.
Figure 3:
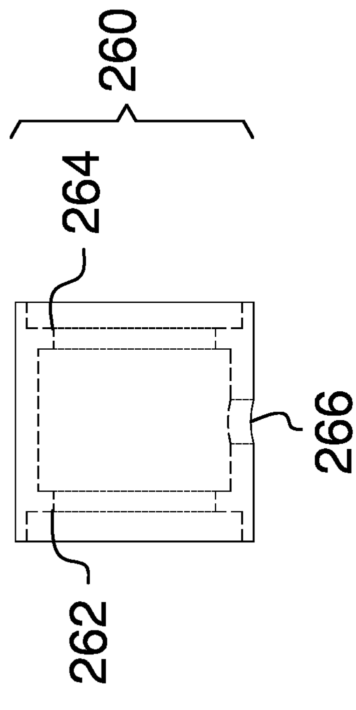
FIG. 3 is a top view of an embodiment of the disclosure, illustrating the water jacket.
Figure 4:
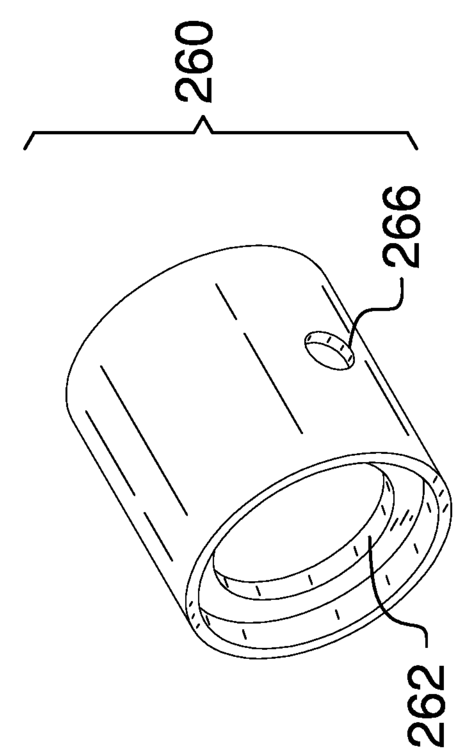
FIG. 4 is an isometric detail view of an embodiment of the disclosure, illustrating the water jacket.
Figure 5:
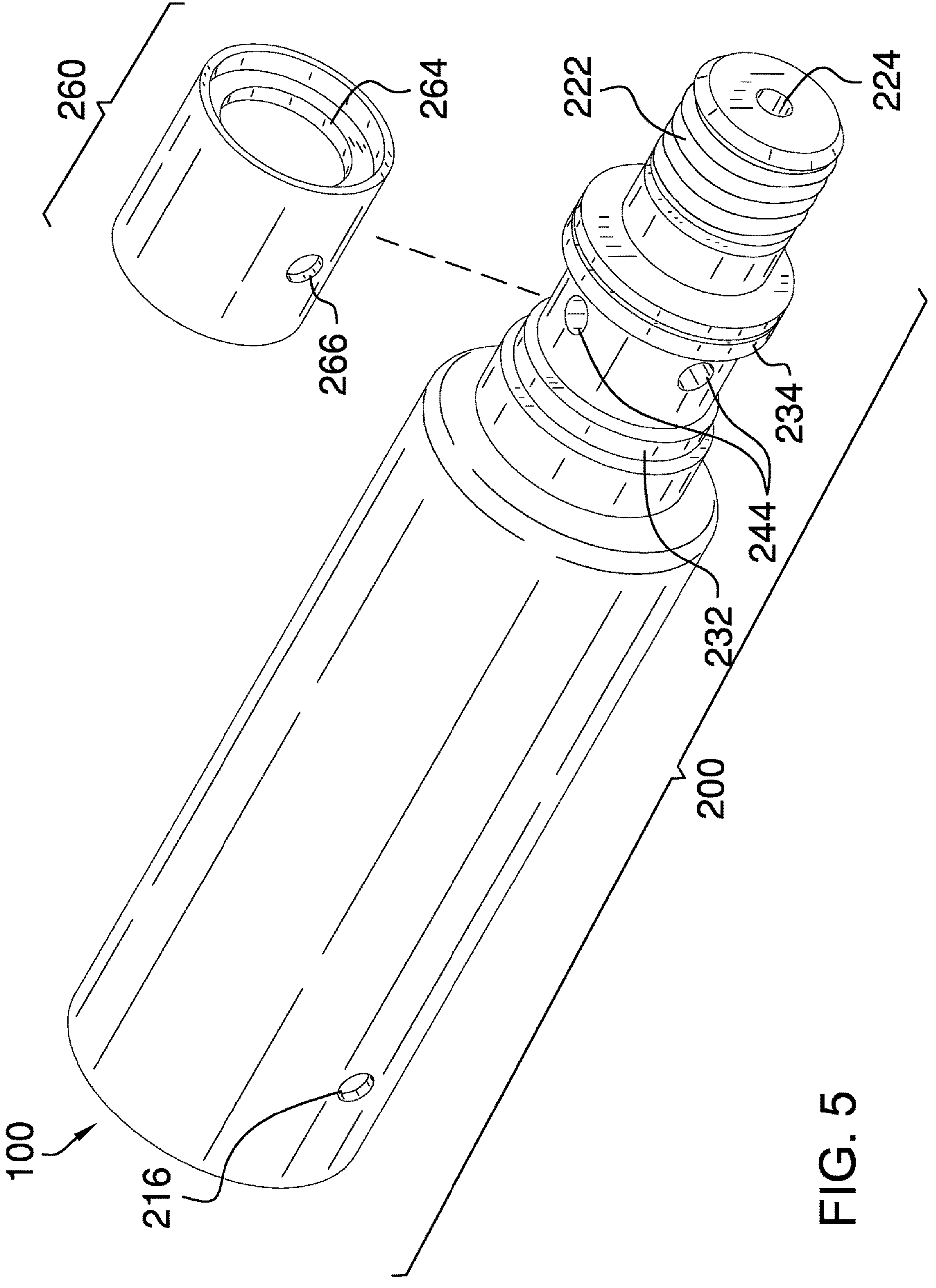
FIG. 5 is a detail view of an embodiment of the disclosure, illustrating the positioning of the water jacket on the adapter.
Figure 6:
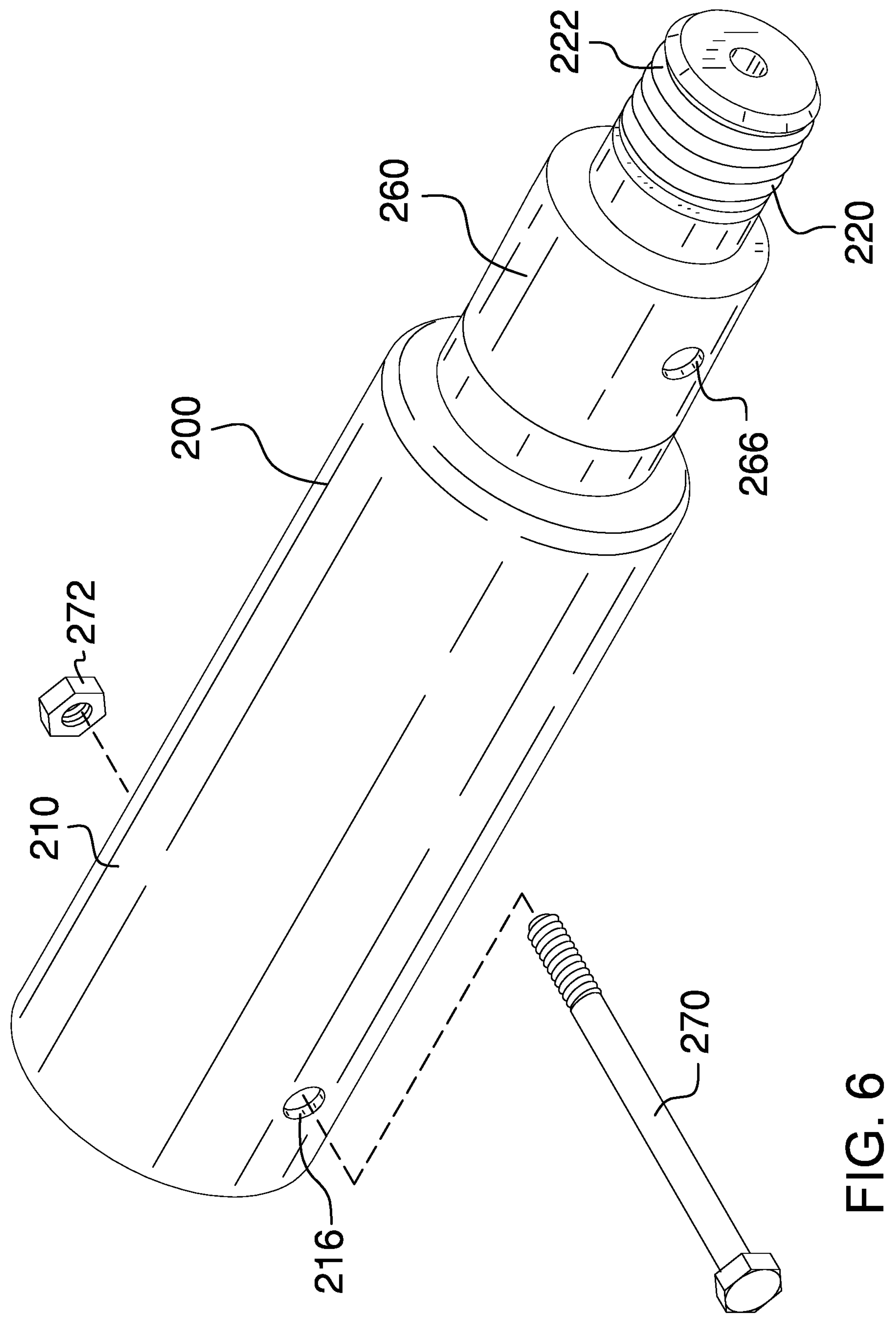
FIG. 6 is an in-use view of an embodiment of the disclosure.
Figure 7:
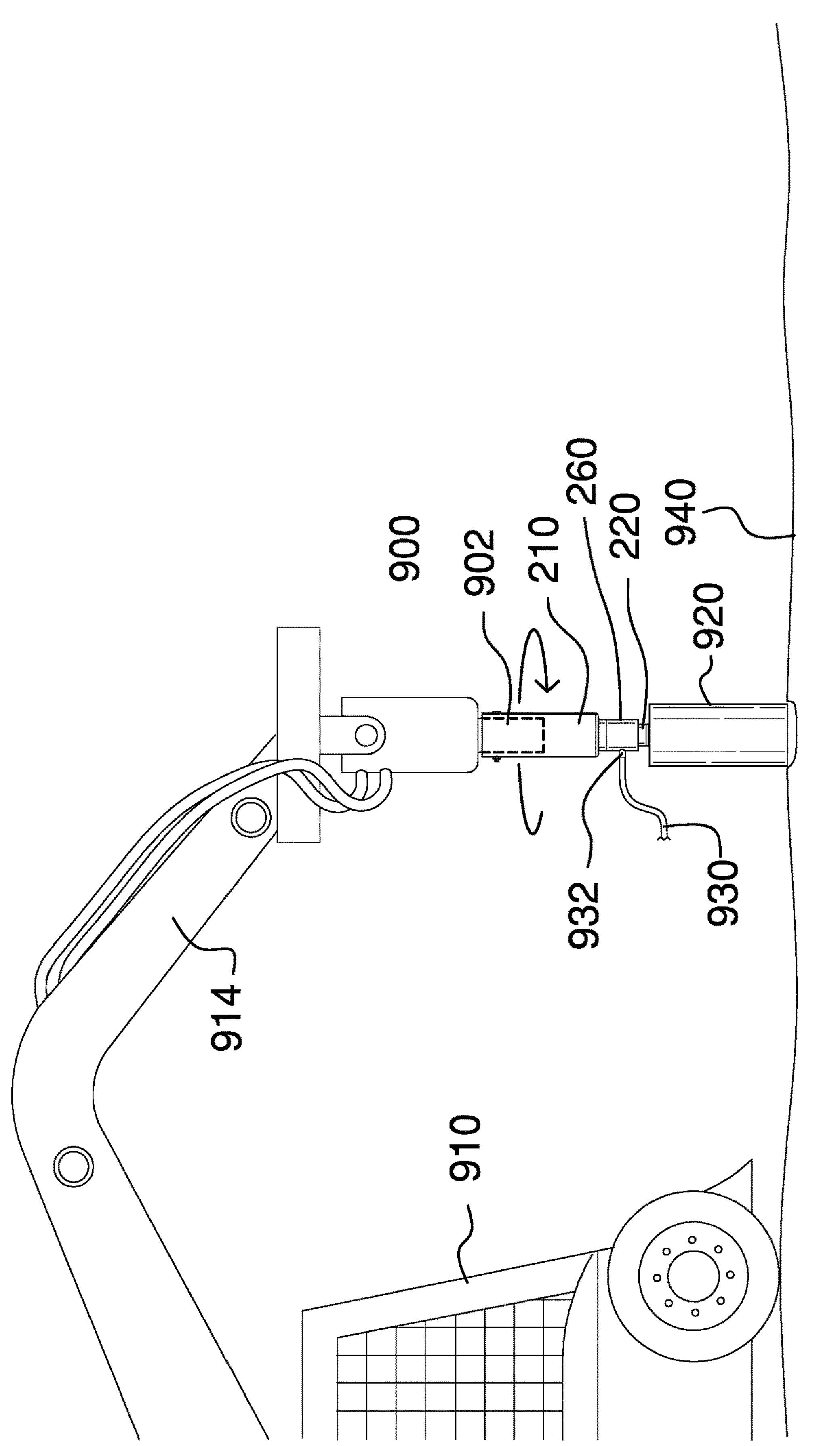
FIG. 7 is an in-use view of a second embodiment of the disclosure.

Detailed reference will now be made to a first potential embodiment of the disclosure, which is illustrated in FIGS. 1 through 7.

The adapter for use with a core bit and auger motor 100 (hereinafter invention) comprises an adapter 200 and a water jacket 260. The adapter 200 may adapt a motor shaft 902 of an auger motor 900 to drive a core bit 920 to cut concrete 940. The water jacket 260 may supply water to the adapter 200 such that the water may flow down through the center of the adapter 200 and into the core bit 920. The water may cool the core bit 920, may reduce airborne dust, may wash debris away from the hole being cut, or any combination thereof. The water jacket 260 may rotationally couple to the adapter 200 such that the water jacket 260 remains stationary while the adapter 200 turns. As a non-limiting example, the auger motor 900 may be mounted on a boom 914 of a front end loader 910 such as a skid steer loader.

The adapter 200 may comprise an auger motor coupler 210, a core coupler 220, and a water jacket coupler 230. The adapter 200 may be oriented vertically during use with the auger motor coupler 210 at the top, the core coupler 220 at the bottom, and the water jacket coupler 230 between the auger motor coupler 210 and the core coupler 220.

The auger motor coupler 210 may be configured to couple to the motor shaft 902 of the auger motor 900 such that rotation of the motor shaft 902 causes rotation of the adapter 200. The auger motor coupler 210 may be cylindrical and may comprise a cylindrical cavity 212 within the auger motor coupler 210. The cylindrical cavity 212 may be axially aligned at the center of the auger motor coupler 210 and may be open at a motor shaft aperture 214 located at the top of the auger motor coupler 210 to expose the cylindrical cavity 212.

The auger motor coupler 210 may comprise a bolt aperture 216. The bolt aperture 216 may pass horizontally through the center of the auger motor coupler 210. The height of the bolt aperture 216 on the auger motor coupler 210 may be selected to align with a matching aperture on the motor shaft 902 such that the bolt aperture 216 on the auger motor coupler 210 and the matching aperture on the motor shaft 902 align when the motor shaft 902 is placed into the cylindrical cavity 212 and rotated to align the bolt aperture 216 and the matching aperture. The motor shaft 902 may slide into the cylindrical cavity 212 and may be held in place by a retention bolt 270 passing through the bolt aperture 216 and the matching aperture and fastened by a retention nut 272.

The diameter of the cylindrical cavity 212 may be larger than the diameter of the motor shaft 902 such that the motor shaft 902 may fit into the cylindrical cavity 212. The outside diameter of the auger motor coupler 210 may be larger than the diameter of the cylindrical cavity 212 such that a wall is formed around the motor shaft 902.

The core coupler 220 may be configured to couple to the core bit 920 such that rotation of the adapter 200 causes rotation of the core bit 920. The core coupler 220 may be a vertically-oriented cylindrical shaft. The core coupler 220 may comprise a threaded shaft 222 at the bottom end of the core coupler 220 such that the core coupler 220 may couple to a threaded coupling aperture on the top of the core bit 920.

The core coupler 220 may comprise a bottom water channel 224. The bottom water channel 224 may be an aperture passing vertically through the center of the core coupler 220. The water may flow from the water jacket coupler 230 to the interior of the core bit 920 via the bottom water channel 224 in the core coupler 220.

The handedness of the threads on the core coupler 220 and the core bit 920 may be such that the coupling between the core coupler 220 and the core bit 920 tightens during use. The gender, handedness, form, angle, pitch, diameter, and thread depth of threads on the core coupler 220 and threads in the threaded coupling aperture of the core bit 920 may be compatible such that the adapter 200 and the core bit 920 may mate by screwing the core bit 920 onto the bottom of the adapter 200.

The water jacket coupler 230 may be configured to convey rotation of the auger motor coupler 210 to the core coupler 220. The water jacket coupler 230 may be further configured to rotationally couple to the water jacket 260 and to accept the water from the water jacket 260. The water jacket coupler 230 may pass the water into the center of the adapter 200 and down to the core coupler 220.

The water jacket coupler 230 may comprise an upper collar 232, a lower collar 234 and a center barrel 240. The water jacket 260 may be configured to rotate around the water jacket coupler 230 supported by the upper collar 232 and the lower collar 234. The upper collar 232 and the lower collar 234 may comprise a first diameter and the center barrel 240 may comprise a second diameter where the second diameter is smaller than the first diameter such that a water cavity exists between the water jacket 260 and the center barrel 240.

The water jacket coupler 230 may comprise a top water channel 248 and a plurality of water inlets 244. The top water channel 248 may be an aperture passing vertically through the center of the water jacket coupler 230 from the plurality of water inlets 244 to the core coupler 220. The top water channel may join the bottom water channel 224 to form one continuous channel for the water to flow through. The plurality of water inlets 244 may comprise one or more radially aligned horizontal apertures extending from the outer surface of the center barrel 240 to the center of the water jacket coupler 230 where the plurality of water inlets 244 may join the top water channel 248. The plurality of water inlets 244 may be equally spaced around the center barrel 240. The water may flow into the plurality of water inlets 244 and out through the bottom of the adapter 200 via the top water channel 248 and the bottom water channel 224. In a preferred embodiment, there may be four water inlets.

In some embodiments, a tangential groove 242 may encircle the center barrel 240 to distribute the water to the plurality of water inlets 244. The tangential groove 242 may be aligned at the height of the plurality of water inlets 244.

The water jacket 260 may be a hollow cylindrical tube that may rotationally couple to the adapter 200 at the water jacket coupler 230. The water jacket 260 may be supported by the upper collar 232 and the lower collar 234 of the water jacket coupler 230. The water jacket 260 may rotate around the upper collar 232 and the lower collar 234. The water jacket 260 may comprise a first internal ring 262 and a second internal ring 264. The first internal ring 262 may press against the bottom of the upper collar 232 and the second internal ring 264 may press against the top of the lower collar 234 to establish the height of the water jacket 260 on the adapter 200.

The water jacket 260 may comprise a water coupler aperture 266. The water coupler aperture 266 may pass horizontally through the water jacket 260 such that the water may flow into the water jacket 260. The water coupler aperture 266 may be operable to pass the water into the water cavity. The water coupler aperture 266 may be threaded to accept a nipple 932 such that a water hose 930 may introduce the water into the adapter 200. The water flowing through the water coupler aperture 266 may pass through the water cavity to the plurality of water inlets 244 on the water jacket coupler 230 and then through the plurality of water inlets 244, the top water channel 248, and the bottom water channel 224 finally reaching the interior of the core bit 920.

In use, the adapter 200 may be mounted on the motor shaft of the auger motor 900 by sliding the motor shaft 902 into the cylindrical cavity 212 on the top of the adapter 200 and by passing the retention bolt 270 through the bolt aperture 216 and through the matching aperture in the motor shaft 902. The retention nut 272 may prevent the retention bolt 270 from vibrating loose. The core bit 920 may be mounted on the bottom of the adapter 200 by screwing the threaded coupling aperture onto the threaded shaft 222 at the bottom of the adapter 200. A water hose 930 may be coupled to a nipple 932 on the water jacket 260 and the water may flow through the water hose 930 into the water jacket 260. The boom 914 of the front end loader 910 may position the core bit 920 above a desired location for a hole. The auger motor 900 may be energized and the boom 914 may be lowered to press the core bit 920 against the concrete 940.

The core bit 920 may cut the concrete 940. The water may cool the core bit 920, may reduce airborne dust, may wash debris away from the hole being cut, or any combination thereof.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used in this disclosure, a "cavity" may be an empty space or negative space that is formed within an object.

As used in this disclosure, a "channel" may be a tubular passage through which an object or fluid is passed through.

As used in this disclosure, a "collar" may be a ring like device that is placed around an object.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "interior" may be used as a relational term that implies that an object is located or contained within the boundary of a structure or a space.

As used in this disclosure, a "motor" may refer to a device that transforms energy from an external power source into mechanical energy.

As used in this disclosure, a "nut" may be a first object that is formed with a cylindrical negative space that further comprises an interior screw thread such that a second object with a matching exterior screw thread can screwed into the first object forming a threaded connection. A nut is further defined with an inner diameter.

As used herein, "outside diameter" or "outer diameter" may refer to a measurement made on an object. Specifically, the outside diameter is the distance from one point on the outside of the object to a point on the opposite side of the object along a line passing through the center of the object.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An adapter system for use with a core bit and auger motor comprising:
- an adapter and a water jacket;
- wherein the adapter adapts a motor shaft of the auger motor to drive the core bit to cut concrete;
- wherein the water jacket supplies water to the adapter such that the water flows down through the center of the adapter and into the core bit;
- wherein the water cools the core bit, reduces airborne dust, washes debris away from the hole being cut, or any combination thereof;
- wherein the water jacket rotationally couples to the adapter such that the water jacket remains stationary while the adapter turns;
- wherein the adapter is further defined with an auger motor coupler, which is configured to couple to the motor shaft of the auger motor such that rotation of the motor shaft causes rotation of the adapter;
- wherein the auger motor coupler is cylindrical and comprises a cylindrical cavity within the auger motor coupler;
- wherein the cylindrical cavity is axially aligned at a center of the auger motor coupler and is open at a motor shaft aperture located at the top of the auger motor coupler to expose the cylindrical cavity.

2. The adapter system according to claim 1
- wherein the adapter comprises the auger motor coupler, a core coupler, and a water jacket coupler;
- wherein the adapter is oriented vertically during use with the auger motor coupler at the top, the core coupler at the bottom, and the water jacket coupler between the auger motor coupler and the core coupler.

3. The adapter system according to claim 2
- wherein the auger motor coupler comprises a bolt aperture;
- wherein the bolt aperture passes horizontally through the center of the auger motor coupler.

4. The adapter system according to claim 3 wherein the height of the bolt aperture on the auger motor coupler is selected to align with a matching aperture on the motor shaft such that the bolt aperture on the auger motor coupler and the matching aperture on the motor shaft align when the motor shaft is placed into the cylindrical cavity and rotated to align the bolt aperture and the matching aperture;
wherein the motor shaft slides into the cylindrical cavity and is held in place by a retention bolt passing through the bolt aperture and the matching aperture and fastened by a retention nut.

5. The adapter system according to claim 4 wherein the diameter of the cylindrical cavity is larger than the diameter of the motor shaft such that the motor shaft fits into the cylindrical cavity;
wherein the outside diameter of the auger motor coupler is larger than the diameter of the cylindrical cavity such that a wall is formed around the motor shaft.

6. The adapter system according to claim 5 wherein the core coupler is configured to couple to the core bit such that rotation of the adapter causes rotation of the core bit;
wherein the core coupler is a vertically-oriented cylindrical shaft;
wherein the core coupler comprises a threaded shaft at the bottom end of the core coupler such that the core coupler couples to a threaded coupling aperture on the top of the core bit.

7. The adapter system according to claim 6 wherein the core coupler comprises a bottom water channel;
wherein the bottom water channel is an aperture passing vertically through the center of the core coupler;
wherein the water flows from the water jacket coupler to the interior of the core bit via the bottom water channel in the core coupler.

8. The adapter system according to claim 7 wherein the handedness of the threads on the core coupler and the core bit are such that the coupling between the core coupler and the core bit tightens during use.

9. The adapter system according to claim 8 wherein the gender, handedness, form, angle, pitch, diameter, and thread depth of threads on the core coupler and threads in the threaded coupling aperture of the core bit are compatible such that the adapter and the core bit mate by screwing the core bit onto the bottom of the adapter.

10. The adapter system according to claim 9 wherein the water jacket coupler is configured to convey rotation of the auger motor coupler to the core coupler;
wherein the water jacket coupler is further configured to rotationally couple to the water jacket and to accept the water from the water jacket;
wherein the water jacket coupler passes the water into the center of the adapter and down to the core coupler.

11. The adapter system according to claim 10 wherein the water jacket coupler comprises an upper collar, a lower collar and a center barrel;
wherein the water jacket is configured to rotate around the water jacket coupler supported by the upper collar and the lower collar;
wherein the upper collar and the lower collar comprise a first diameter and the center barrel comprises a second diameter where the second diameter is smaller than the first diameter such that a water cavity exists between the water jacket and the center barrel.

12. The adapter system according to claim 11 wherein the water jacket coupler comprises a top water channel and a plurality of water inlets;
wherein the top water channel is an aperture passing vertically through the center of the water jacket coupler from the plurality of water inlets to the core coupler;
wherein the top water channel joins the bottom water channel to form one continuous channel for the water to flow through.

13. The adapter system according to claim 12 wherein the plurality of water inlets comprise one or more radially aligned horizontal apertures extending from the outer surface of the center barrel to the center of the water jacket coupler where the plurality of water inlets join the top water channel;
wherein the plurality of water inlets are equally spaced around the center barrel;
wherein the water flows into the plurality of water inlets and out through the bottom of the adapter via the top water channel and the bottom water channel.

14. The adapter system according to claim 13 wherein there are four water inlets.

15. The adapter system according to claim 13 wherein a tangential groove encircles the center barrel to distribute the water to the plurality of water inlets;
wherein the tangential groove is aligned at the height of the plurality of water inlets.

16. The adapter system according to claim 13 wherein the water jacket is a hollow cylindrical tube that rotationally couples to the adapter at the water jacket coupler;
wherein the water jacket is supported by the upper collar and the lower collar of the water jacket coupler;
wherein the water jacket rotates around the upper collar and the lower collar.

17. The adapter system according to claim 16 wherein the water jacket comprises a first internal ring and a second internal ring;
wherein the first internal ring presses against the bottom of the upper collar and the second internal ring presses against the top of the lower collar to establish the height of the water jacket on the adapter.

18. The adapter system according to claim 17 wherein the water jacket comprises a water coupler aperture;
wherein the water coupler aperture passes horizontally through the water jacket such that the water flows into the water jacket through the water coupler aperture;
wherein the water coupler aperture is operable to pass the water into the water cavity.

19. The adapter system according to claim 18 wherein the water coupler aperture is threaded to accept a nipple such that a water hose introduces the water into the adapter;
wherein the water flowing through the water coupler aperture passes through the water cavity to the plurality of water inlets on the water jacket coupler and then through the plurality of water inlets, the top water channel, and the bottom water channel finally reaching the interior of the core bit.

* * * * *